United States Patent [19]
Wylie

[11] Patent Number: 5,350,048
[45] Date of Patent: Sep. 27, 1994

[54] MODULAR COMPONENT SYSTEM FOR ASSEMBLY OF MATERIAL FLOW RAILS

[76] Inventor: John F. Wylie, 1606 Colton Dr., Orlando, Fla. 32822

[21] Appl. No.: 41,717

[22] Filed: Apr. 2, 1993

[51] Int. Cl.⁵ .............................................. B65G 13/00
[52] U.S. Cl. .............................. 193/35 A; 193/35 SS; 193/35 R
[58] Field of Search ...................... 193/35 R, 37, 35 A, 193/35 J, 35 SS

[56] References Cited

U.S. PATENT DOCUMENTS

| | | | |
|---|---|---|---|
| 3,263,951 | 8/1966 | Stokes | 193/35 R |
| 3,915,275 | 10/1975 | Specht | 193/35 R |
| 4,205,740 | 6/1980 | Hammond | 193/35 A |
| 4,304,521 | 12/1981 | Hammond | 193/35 A X |
| 4,541,518 | 9/1985 | Palazzolo et al. | 193/35 A |
| 4,645,056 | 2/1987 | Palazzolo et al. | 193/35 A |
| 5,078,250 | 1/1992 | Cole | 193/35 R |

FOREIGN PATENT DOCUMENTS

| | | | |
|---|---|---|---|
| 99555 | 11/1964 | Denmark | 193/35 A |
| 2324256 | 12/1974 | Fed. Rep. of Germany | 193/37 |
| 2338950 | 2/1975 | Fed. Rep. of Germany | 193/37 |
| 1542872 | 2/1990 | U.S.S.R. | 193/37 |

OTHER PUBLICATIONS

Rapistan Brochure, "The New Metal-Based Industrial Rubber Wheel", May 1953.

Primary Examiner—D. Glenn Dayoan
Attorney, Agent, or Firm—Harness, Dickey & Pierce

[57] ABSTRACT

A gravity type roller conveyor for conveying articles has a plurality of rollers mounted on an elongated support member which is movingly positioned within a base. The base is made of at least two components from a plurality of interchangeable modular components which can be assembled in a variety of ways to produce a base which fits within given requirements. The cases are releasably secured to a frame to complete the conveyor. The frame has a plurality of mounting holes in order to easily allow the changing in width of the conveyor. The base incorporates one or more skid plates to stop the articles on the conveyor. An elongated hose is positioned between the base and the support member and, when inflated, causes the support members to raise rollers upwardly so that the rollers project above the skid plates. The hose, when at least partially deflated, causes the support member to lower the rollers downwardly so that the rollers are positioned below the skid plate whereby the articles supported by the rollers are lowered into engagement with the braking surfaces. A control device provides pressurized air to the hose in a pulsating manner to cause cyclical raising of the articles.

16 Claims, 4 Drawing Sheets

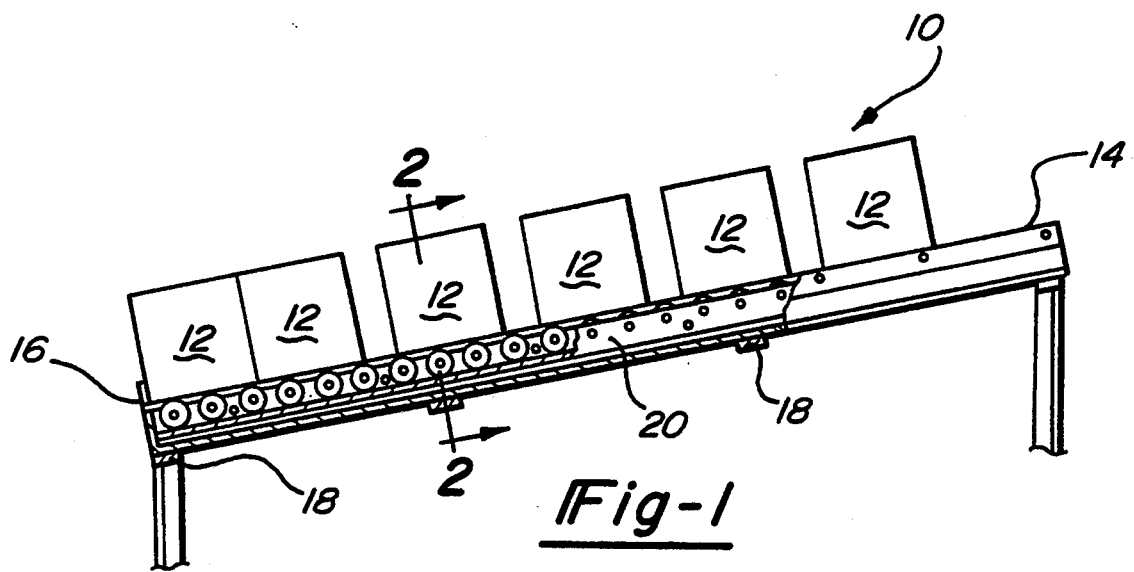
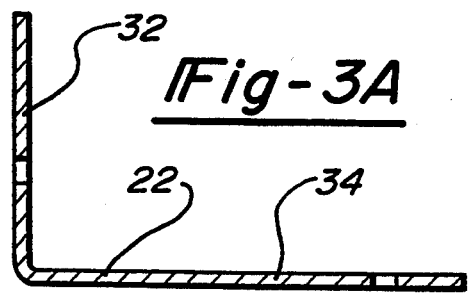
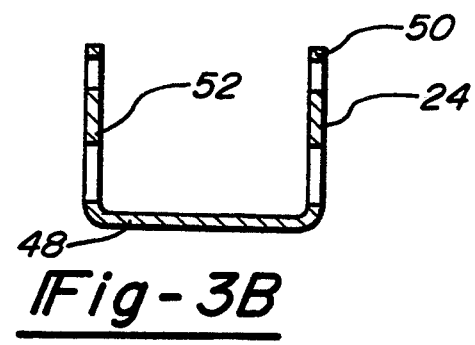
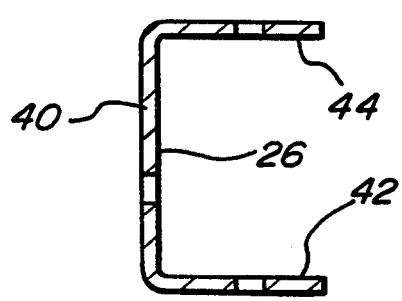
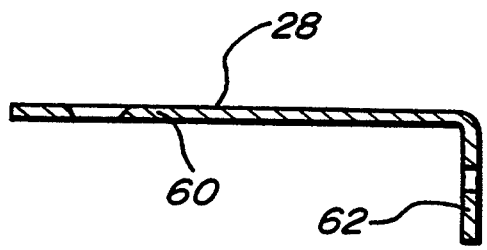
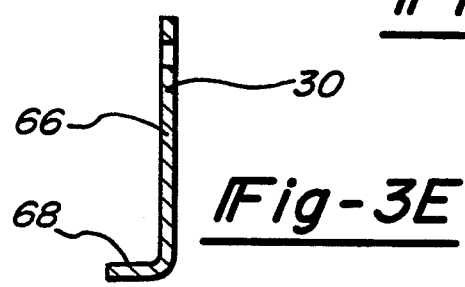

MODULAR COMPONENT SYSTEM FOR ASSEMBLY OF MATERIAL FLOW RAILS

FIELD OF THE INVENTION

The present invention relates to inclined gravity type wheel or roller conveyors. More particularly the present invention relates to an modular inclined gravity type wheel or roller conveyor which is assembled from a series of interchangeable standard components to allow the individual user to customize the wheel or roller conveyor to his own unique application.

BACKGROUND AND SUMMARY OF THE INVENTION

Gravity type wheel or roller conveyors are well known in the art and are used to transport articles from one point to another without the requirement for external sources of power to move the articles. A typical gravity type wheel or roller conveyor comprises an inclined, elongated frame having a series of wheels or rollers which are arranged along the frame with the rotational axes of the wheels or rollers being located perpendicular to the longitudinal direction of the frame. Articles loaded onto the conveyor at its top or higher end are supported by a portion of the wheels or rollers. As gravity works on the articles loaded onto the conveyors, the articles move over the wheels or rollers towards the bottom or lower end of the frame. Different wheels or rollers support the articles as they continue their movement along the conveyor.

While some of these gravity type wheel or roller conveyors operate effectively without any type of external control, when the length of the wheel or roller conveyor and/or the weight of the articles being conveyed increases significantly, it becomes necessary to add external controls to the conveyor to limit the speed and acceleration of the articles as they move along the conveyor.

Various methods have been proposed to control the movement of the articles as they travel along the conveyor. Most of these methods involve the use of intermittently actuated brakes. One known gravity type wheel or roller conveyor employing an intermittently actuated brake utilizes a plurality of rubber support rollers having internal brakes associated therewith for intermittently stopping the wheels or rollers. However, successful control of the wheels or rollers can be achieved only when the operating conditions are precisely controlled. When variations in the operating conditions occur, the brakes do not always stop the wheel or rollers and thus proper control of the wheels or rollers, namely intermittent braking thereof, does not always result.

Another known wheel or roller conveyor uses an elongated brake member positioned below the wheel or rollers. This elongated brake member is moved upwardly by inflation of a flexible hose for engaging the wheels or rollers to periodically brake their rotation. While this system is at least partially effectively for controlling the rate of movement of the articles down the conveyor, the system still possesses undesirable structural and operational features. For example, the brake is applied only when the hose is inflated. Accordingly, when a failure in the inflating system or hose occurs, the brakes cannot be applied and the movement of the articles along the conveyor is uncontrolled.

Yet another known wheel or roller conveyor uses a stationary elongated brake member or brake plate positioned adjacent to the wheels or rollers. This type of wheel or roller conveyor, rather than moving the brake member up and down, moves the wheels or rollers up and down by inflation of a flexible hose. When there is no pressure within the hose, the wheels or rollers are positioned below the brake member or brake plate. Upon the pressurization of the hose the wheels or rollers are moved upwardly to contact and raise the articles off of the brake plate and onto the wheels or rollers for movement down the conveyor. When pressure is subsequently released, the articles come to rest again on the brake plate. In this type of wheel or roller conveyor, the wheel or roller system is cyclically raised and lowered so that the articles are cyclically raised off the stationary brake plates to permit a gravity urged advance along the conveyor, followed by lowering the article onto the stationary brake plate to stop the articles. This cyclic action therefore achieves a high level of speed control. For this type of wheel or roller conveyor, any failure of the inflation system or hose causes the articles to come to rest on the brake plate and does not allow continued movement of the articles down the conveyor.

Various refinements to the movable wheel or roller type of conveyor have been proffered. These include designs which incorporate alignment structures for insuring that the articles remain in the proper position on the conveyor as it moves down the conveyor and designs which specifically locate the braking plates in relation to a wooden pallet containing the articles such that the nails of the wooden pallets are continuously pounded into the pallets as the pallets make their way down the conveyor.

While the above noted wheel or roller conveyors have been utilized in industry, they all have the problem that each application which requires a wheel or roller conveyor requires a new size or design of wheel or roller conveyor in order to physically accommodate the wide variety of sizes of articles and/or pallets which need to be conveyed. This is especially true where the wheel or roller conveyor incorporates an alignment structure or when the wheel or roller conveyor is used to reset nails in pallets. The prior art alignment structures rely on contact between an angled alignment bracket on the conveyor with the articles or pallets. Therefore the width and type of the conveyor has to be designed for specific articles or pallets. Similarly when the brake plate is also used to reset nails in the pallets, the brake plates need to be positioned directly under the nails thus requiring specifically dimensioned conveyors for specific pallets. Once a pallet or article size changes, the conveyors must also be changed.

Accordingly, what is needed is a wheel or roller conveyor which is adjustable in order to accommodate a wide variety of pallet or article sizes. The present invention provides the art with an modular wheel or roller conveyor system which is created using a number of interchangeable standard components. The assembled modular conveyor is easily reworked using the interchangeable standard components to provide a wheel or roller conveyor which is capable of accommodating a wide variety of pallet and article sizes.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 1 is an elevational view of the interchangeable modular component wheel conveyor according to the present invention;

FIG. 3a is a sectional view of the main support frame;

FIG. 3b is a sectional view of the wheel and roller U-channel;

FIG. 3c is a sectional view of the C-channel mounting plate or skid plate:

FIG. 3d is a sectional view of the skid plate;

FIG. 3e is a sectional view of the mounting support arm;

DETAILED DESCRIPTION OF THE PREFERRED EMBODIMENT

Figure 2:
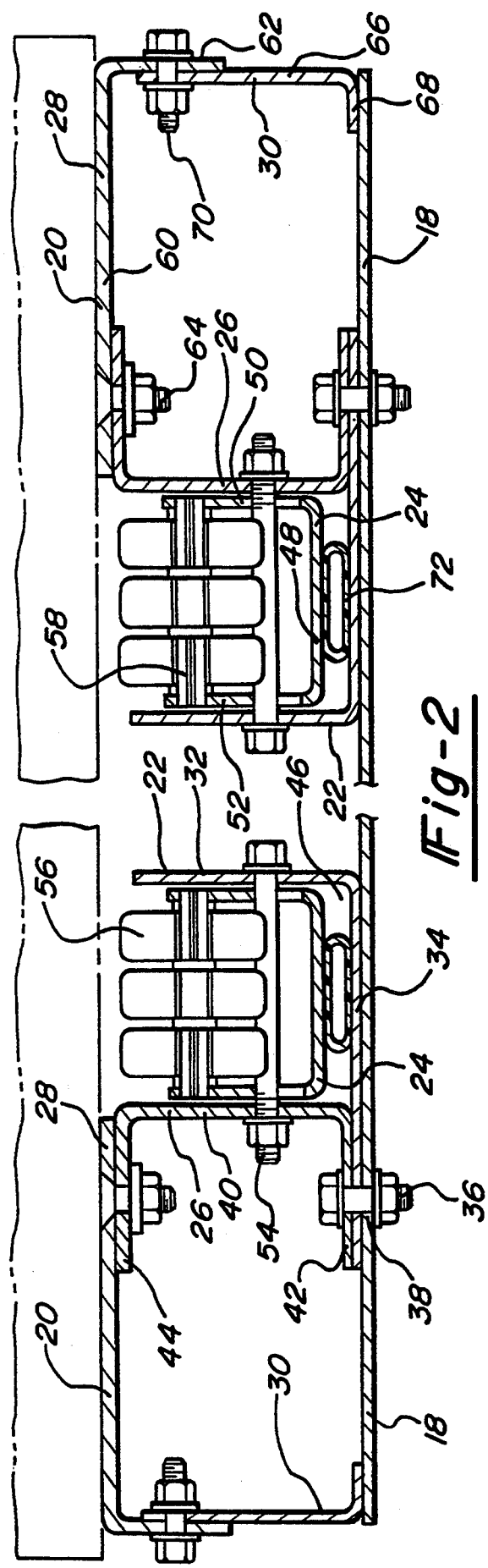
FIG. 2 is a sectional view taken along line 2—2 of FIG. 1 showing a typical assembly of the interchangeable modular components.

Referring now to the drawings in which like reference numerals designate like or corresponding parts throughout the several views, there is shown in FIG. 1, an inclined gravity type wheel conveyor which is generally designated by the reference numeral 10. Conveyor 10 is used for transporting articles 12, which may or may not be palletized, from an inlet or supply point 14 at the upper or higher end of conveyor 10 to an outlet or discharge port 16 at the lower end of conveyor 10.

Conveyor 10 includes a stationary frame 18 which supports at least one track assembly 20. Frame 18 can be a single sheet of material, a plurality of plates as shown in FIG. 1, a plurality of angle irons or any other type of structure to provide lateral support for the standard components of conveyor 10. Conveyor 10 is illustrated in the embodiment shown in FIG. 1 having two identical track assemblies 20 positioned on frame 18. Track assemblies 20 are movable laterally relative to frame 18 to accommodate various widths and types of articles or pallets as will be described later herein.

Each track assembly 20 is comprised of a main support frame 22, a wheel and roller U-channel 24, a C-channel mounting plate 26, a skid plate 28, and a mounting support arm 30. Main support frame 22 is shown in FIG. 3a, wheel and roller U-channel 24 is shown in FIG. 3b, C-channel mounting plate 26 is shown in FIG. 3c, skid plate 28 is shown in FIG. 3d and mounting support arm 30 is shown in FIG. 3e. Main support frame 22 comprises a generally L-shaped frame having a vertical wall 32 and a generally horizontal wall 34. Horizontal wall 34 is mated with and mounted to frame 18 by a plurality of bolts 36 extending through mounting holes 38 in frame 18. By providing a plurality of frames 18 each having a different width, or by providing a plurality of mounting holes 38 in frame 18, it is possible to quickly and easily vary the width between two or more track assemblies 20 secured to frame 18 in order to accommodate various widths and types of articles or pallets. Spaced from vertical wall 32 and mounted to horizontal wall 34 of support frame 22 also by the plurality of bolts 36 is C-channel mounting plate 26. C-channel mounting plate 26 has a vertical wall 40 and a pair of substantially parallel sidewalls 42 and 44 projecting horizontally from vertical wall 40. Sidewall 42 is utilized to secure mounting plate 26 to main support frame 22. Vertical wall 32 and horizontal wall 34 of main support frame 22 in conjunction with vertical wall 40 of C-channel mounting plate 26 define a longitudinally extending cavity 46. Disposed within cavity 46 is wheel and roller U-channel 24. U-channel 24 includes a bottom wall 48 and a pair of substantially parallel sidewalls 50 and 52 projecting vertically upward therefrom. Wheel and roller U-channel 24 is slidingly received within cavity 46 and is longitudinally located within cavity 46 by a plurality of bolts 54 which extend through vertical wall 32, sidewalls 50 and 52 and vertical wall 40. Rotatably mounted within wheel and roller U-channel 30 are a plurality of wheels 56. Wheels 56 are rotatably mounted on a shaft 58 which is supported by and extends between sidewalls 50 and 52. Wheels 56 are operative to support the weight of the articles or pallets when U-channel 24 is located in its upward position as will be described later herein.

Skid plate 28 is an L-shaped member having a horizontal wall 60 and a vertical wall 62. Horizontal wall 60 is secured to sidewall 44 of mounting plate 26 by a plurality of bolts 64. Bolts 64 are countersunk into the surface of horizontal wall 60 to provide a smooth skid surface for the material being conveyed. Mounting support arm 30 is also an L-shaped member having a vertical wall 66 and a horizontal wall 68. Vertical wall 66 mates with and is secured to vertical wall 62 of skid plate 28 by a plurality of bolts 70. Mounting support arm 30 thus provides support to skid plate 28 by virtue of horizontal wall 68 bearing against frame 18.

To permit U-channel 24 and thus wheels 56 to be vertically raised and lowered relative to cavity 46, conveyor 10 is provided with an elongated flexible inflatable hose 72 which is located in cavity 46 between main support frame 22 and U-channel 24. Hose 72 is positioned on horizontal wall 34 and directly beneath bottom wall 48, thus being confined between walls 34 and 48. Hose 72 is connected to a cyclical source of pressurized air (not shown) such that hose 72 is alternately inflated and deflated. When inflated, U-channel 24 is displaced upwardly, thus positioning the upper surfaces of wheels 56 above the level of skid plate 28. In this position, the articles or pallets are supported solely by the wheels 56 and move downwardly along conveyor 10 by means of gravity.

When hose 72 is deflated, U-channel 24 moves downward under its own weight into the position shown in FIG. 2. In this position, the upper surfaces of wheels 56 are positioned below the level of skid plate 28 and thus the articles or pallets formerly supported by wheels 56 are lowered onto skid plate 28, thus causing the articles or pallets to be braked by means of friction.

Thus, as hose 72 is alternately and cyclically inflated and deflated, articles 12 are in turn supported first on wheels 56 whereupon they move downwardly along conveyor 10, and second on skid plate 28 where the downward movement of articles 12 is checked by frictional engagement with skid plate 28.

It will be noted that in FIG. 2, skid plates 28 are only provided at the outside edges of conveyor 10, and in particular outwardly of wheels 56. This is the preferred position for wheels 56 and skid plates 28 when articles being carried by conveyor 10 are to be supported on a pallet which engages conveyor 10. If we assume the articles are particularly heavy, the pallet supporting these articles can be deflected downwardly towards its center point. For this particular case, if skid plates 28 were located inwardly of wheels 56, the downward deflection of the pallet could cause frictional engagement between conveyor 10 and the pallet base even when the pallet is supported by wheels 56, thus impairing the proper operation of the conveyor. The interchangeable, modular and/or adjustable feature of the present invention allows for the placement of wheels 56 and skid pads 28 in the optimum position in order to accommodate virtually any loading conditions being experienced by the pallet. The individual interchangeable modular components are releasably connected by means of bolts 36, 64 and 70. By providing the plurality of pre-drilled bolt holes 38 in frame 18, the position of each track assembly 20 may be laterally adjusted by relocating them relative to frame 18. In addition, the width of the braking surface of skid plate 28 may be adjusted if desired by selecting a skid plate 28 having the desired length of horizontal wall 60. Such adjustment provides enormous flexibility since it enables conveyor 10 to be adapted to carry specific types and sizes of loads.

Figure 4:
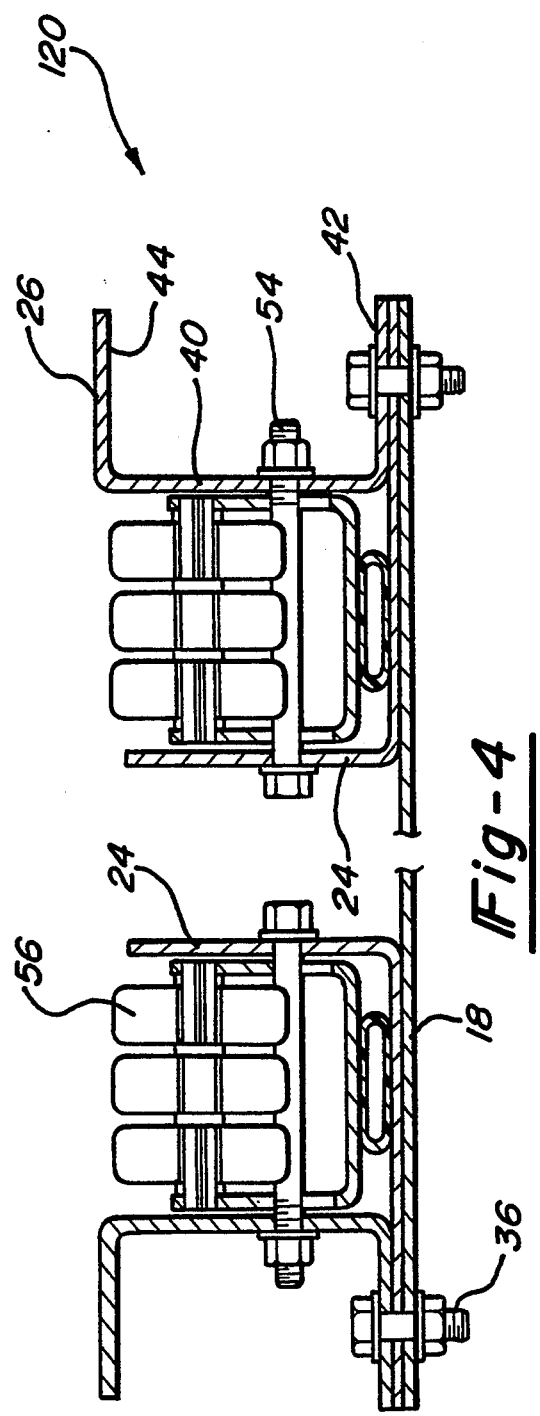
FIG. 4 is a sectional view similar to that of FIG. 2 but showing the assembly of the interchangeable modular components according to another embodiment of the present invention.

FIG. 4 shows an assembly 120 of the interchangeable modular components according to another embodiment of the present invention. Track assembly 120 is identical to track assembly 20 except for skid plate 28 and mounting support arm 30. This derivative of the interchangeable modular components can be used when space and/or load conditions do not permit or require the addition of skid plate 28 and its associated support arm 30. For this embodiment, upper wall 44 of C-channel mounting plate 26 also serves as a skid plate. Other than the elimination of the two components, track assembly 120 is identical to track assembly 20 in construction and operation.

Figure 5:
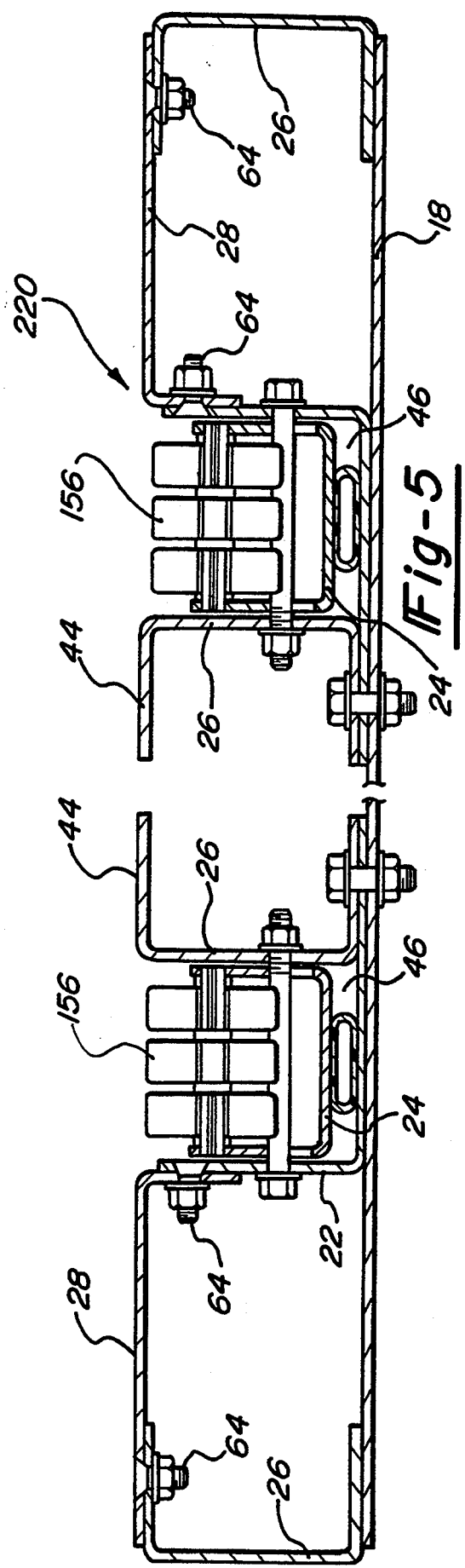
FIG. 5 is a sectional view similar to that of FIG. 2 but showing the assembly of the interchangeable modular components according to another embodiment of the present invention.

FIG. 5 shows an assembly 220 of the interchangeable modular components according to another embodiment of the present invention. Track assembly 220 is assembled by using the interchangeable standard components which were used for track assemblies 20 and 120 with the exception of rollers 56. Track assembly 220 uses rollers 156 in place of rollers 56. Rollers 156 have a crowned exterior surface in place of the generally cylindrical exterior surface of rollers 56. The crowning of the exterior surface of rollers 156 allows rollers 156 to slightly imbed into a wooden or other soft pallet in order to aid in the tracking of the pallet as it moves down the conveyor. Other than the crowning of the exterior surface, rollers 156 are identical to rollers 56 and are fully interchangeable therewith in the other embodiments of the present invention. Track assembly 220 is assembled to provide a skid plate on both sides of each set of rollers 156.

Each track assembly 220 is comprised of a main support frame 22, a wheel and roller U-channel 24, two C-channel mounting plates 26 and a skid plate 28. Main support frame 22 and one of the two C-channel mounting plates 26 are bolted to frame 18 to form cavity 46. This is similar to track assembly 20 except that C-channel mounting plate 26 forms the wall of cavity 46 directed towards the center of the conveyor and main support frame 22 forms the wall of cavity 46 directed towards the outside of the conveyor. This is reversed from their positions for track assembly 20.

Skid plate 28 is also reversed from its position for track assembly 20 and is bolted to main support frame 22 using a plurality of bolts 64. The use of counterbored bolts 64 allows for the free movement of U-channel 24 within cavity 46. The opposite end of skid plate 28 is supported by the second C-channel mounting plate 26 which is secured to skid plate 28 by an additional plurality of countersunk bolts 64. Track assembly 220 thus provides a skid plate on both sides of each set of wheels 156. Skid plate 28 functions on one side of wheels 156 while upper wall 44 of C-channel mounting plate 26 functions as a skid plate on the opposite side of wheels 156. The remaining construction and the overall operation of track assembly 220 is identical to that of track assembly 20 and 120.

FIGS. 6a through 6g show various arrangements for wheels 56 or 156 which can be achieved using the interchangeable modular components of the present invention. The various configurations are shown comprised of wheels 56 or 156 supported by bushings with spacer bushings being positioned where it becomes necessary or desirable to eliminate or space wheels 56 or 156.

Figure 6B:
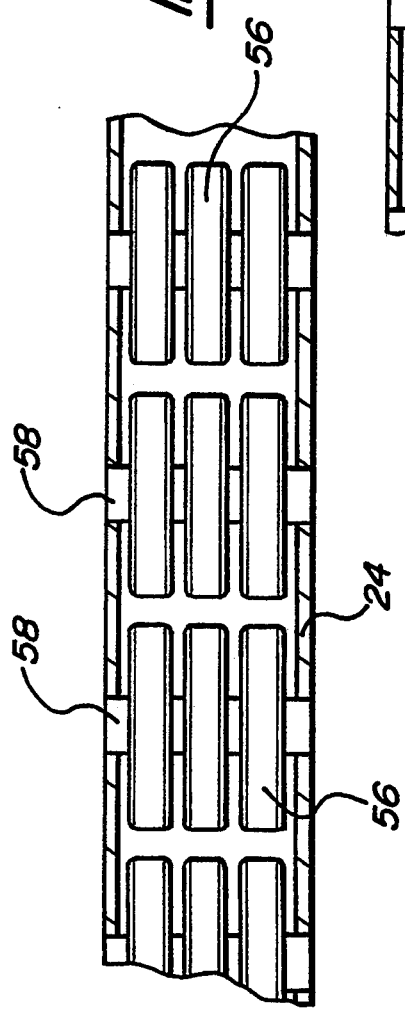
FIG. 6b is a plan view similar to that of FIG. 6a showing the arrangement of the rollers on the conveyor according to another embodiment of the present invention.
Figure 6A:
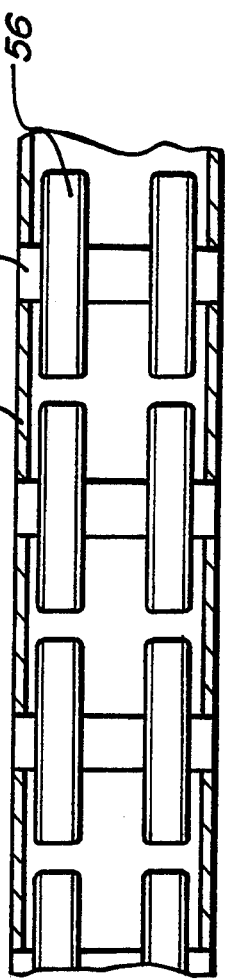
FIG. 6a is a plan view of the wheel conveyor of claim 1 showing the arrangement of the wheels on the conveyor.

FIG. 6a shows the configuration where each axle shaft 58 has a full compliment of wheels 56 and the full compliment of wheels 56 are positioned at each location provided for axle shafts 58. Thus, this represents the largest number of wheels 56 capable of being assembled into track assemblies 20, 120 or 220.

FIG. 6b shows the configuration where the center wheels 56 have been eliminated and replaced by a spacer bushing. This configuration may be used where weight, size or design of the articles or pallets being transported does not require the full compliment of wheels 56 as shown in FIG. 6a.

Figure 6C:
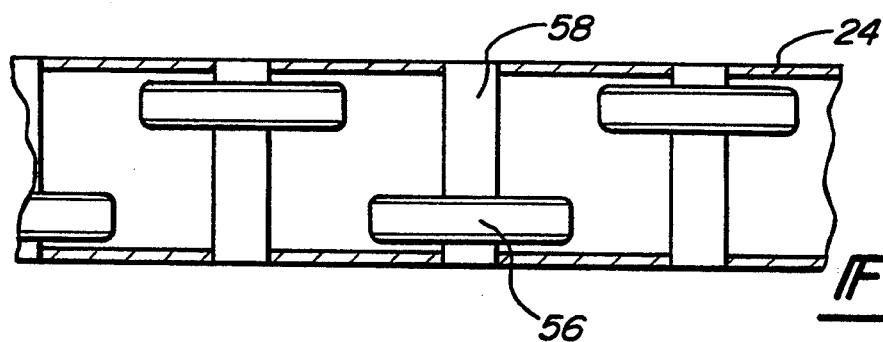
FIG. 6c is a plan view similar to that of FIG. 6a showing the arrangement of the rollers on the conveyor according to another embodiment of the present invention.

FIG. 6c shows the configuration where two of the wheels 56 have been eliminated and replaced by a spacer bushing. The single wheel 56 on each axle shaft 58 is then alternately positioned on opposite sides of wheel and roller U-channel 24 on adjacent axle shafts 58. This configuration may also be used where weight, size or design of the article or pallet being transported does not require the full compliment of wheels 56 as shown in FIG. 6a.

Figure 6D:
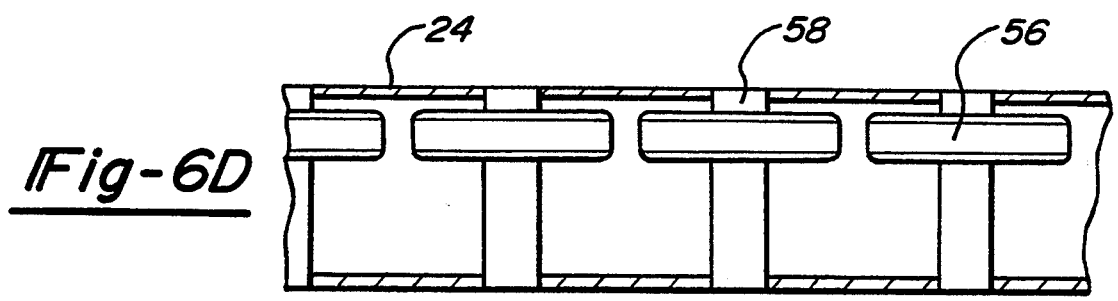
FIG. 6d is a plan view similar to that of FIG. 6a showing the arrangement of the rollers on the conveyor according to another embodiment of the present invention.

FIG. 6d shows another configuration where two of the wheels 56 have been eliminated and replaced by a spacer bushing. The single wheel 56 on each axle shaft 58 in this embodiment is positioned on the same side of wheel and roller U-channel 24 for all axle shafts 58. This configuration may also be used where weight, size or design of the article or pallet being transported does not require the full compliment of wheels 56 as shown in FIG. 6a.

Figure 6E:
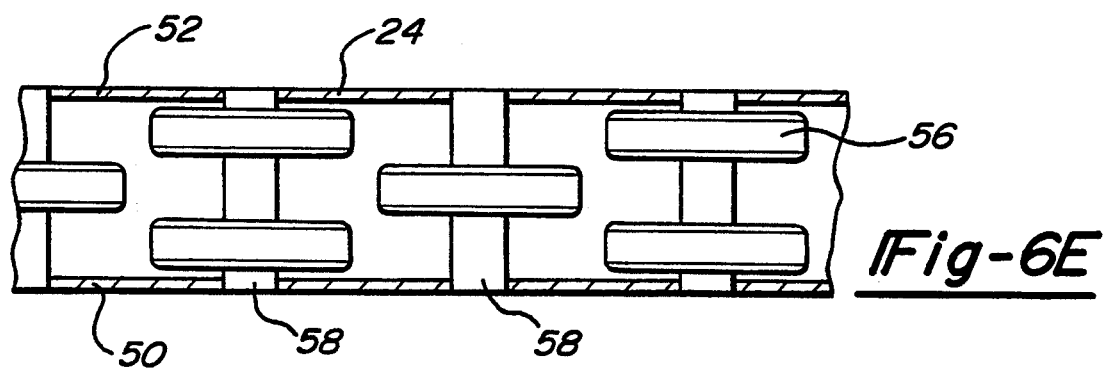
FIG. 6e is a plan view similar to that of FIG. 6a showing the arrangement of the rollers on the conveyor according to another embodiment of the present invention.

FIG. 6e shows another configuration of wheels 56. In this configuration, alternate axle shafts 58 are provided with double and then single wheels 56. The double wheels 56 on axle shafts 58 are positioned adjacent to side walls 50 and 52 of wheel and roller U-channel 24 while the single wheel 56 is positioned in the middle of U-channel 24. This configuration may also be used where weight, size or design of the article or pallet being transported does not require the full compliment of wheels 56 as shown in FIG. 6a.

Figure 6F:
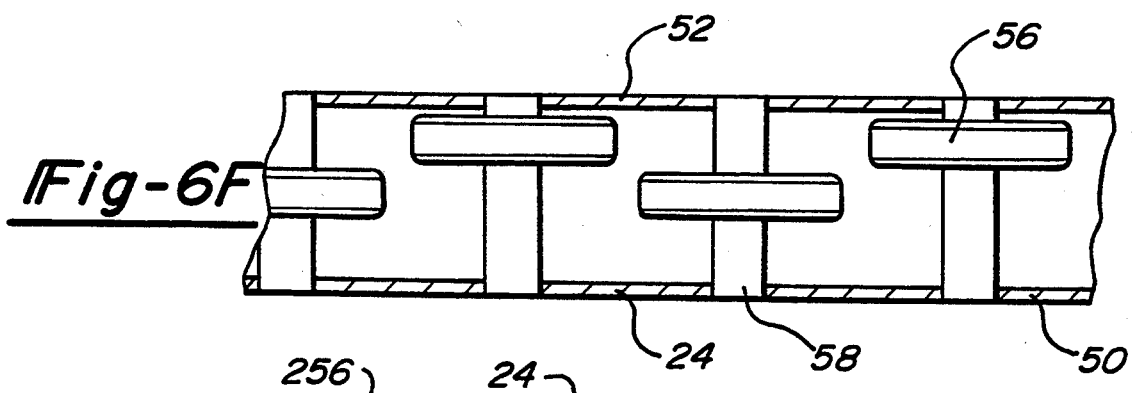
FIG. 6f is a plan view similar to that of FIG. 6a showing the arrangement of the rollers on the conveyor according to another embodiment of the present invention.

FIG. 6f shows another configuration of wheels 56. In this configuration, alternate axle shafts 58 are provided with single wheels 56. The position for wheel 56 on each axle shaft is alternate between the center position and a position adjacent to one of sidewalls 50 and 52 (sidewall 52 is shown in FIG. 6f). This configuration may also be used where weight, size or design of the article or pallet being transported does not require the full compliment of wheels 56 as shown in FIG. 6a.

Figure 6G:
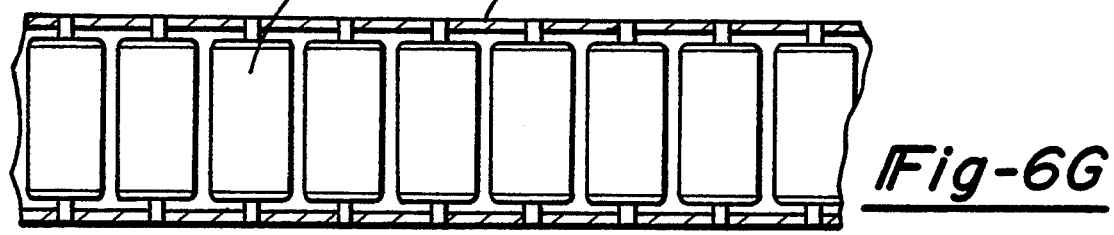
FIG. 6g is a plan view similar to that of FIG. 6a showing the arrangement of the rollers on the conveyor according to another embodiment of the present invention.

FIG. 6g shows a configuration where the wheels 56 on each axle shaft 58 have been replaced by a cylindrical roller 256. This configuration can be used where the arrangements of wheels 56 do not provide for adequate support of the articles or pallets being transported.

While the above detailed description has included various embodiments of the present invention having the individual interchangeable modular components assembled in specific ways, the present invention is not to be limited to the embodiments shown. The interchangeable modular components may be assembled in a variety of ways, as required, in order to accommodate the specific requirements of the user based upon the size, weight and configuration of the articles or pallets which are being conveyed. Similarly, the above description has included a plurality of configurations for the placement of wheels or rollers along the length of the conveyor. The present invention is not to be limited to the configurations shown. The rollers, wheels and spacer bushings may be configured in a variety of ways as required in order to accommodate the specific requirements of the user based upon the size, weight and configuration of the articles or pallets which are being conveyed.

While the above detailed description describes the preferred embodiment of the present invention, it should be understood that the present invention is susceptible to modification, variation and alteration without deviating from the scope and fair meaning of the subjoined claims.

What is claimed is:

1. An interchangeable modular fail-safe gravity type roller conveyor for permitting intermittent controlled movement of articles therealong, said conveyor comprising:
   a fixed frame having a plurality of attachment holes;
   at least one base adapted to be fixedly secured to said frame using at least one of said attachment holes, said base being assembled from at least two of a plurality of interchangeable module components;
   an elongated roller assembly mounted on each of said bases for vertical movement relative thereto, each roller assembly including an elongated support extending longitudinally of said conveyor and a plurality of non-powered rollers rotatably mounted on said support, said plurality of rollers being spaced apart in the longitudinal direction of said support and defining a declining plane which extends at an acute angle in order to allow said articles to move by gravity along said roller assembly when said articles are supported by said roller assembly;
   lifting means coacting between each of said bases and its respective roller assembly for causing cycling vertical reciprocating movement of said respective roller assembly between an upper position and a lower position, said articles exhibiting gravity urged movement along said respective roller assembly when said respective roller assembly is in an upper position, said articles being stopped by contact with said base when said respective roller assembly is in said lower position, said respective roller assembly being urged into said lower position upon failure of said lifting means;
   control means operatively connected to said lifting means for causing cyclic actuation thereof in order to cause said roller assembly to vertically reciprocate between said upper and lower position in a respective manner: and
   wherein said plurality of interchangeable modular components comprises;
   an L-shaped mounting plate: and
   a C-shaped supporting frame secured to said L-shaped mounting plate to form a generally rectangular longitudinally running channel, said elongated roller assembly being disposed within said longitudinally running channel.

2. The roller conveyor of claim 1 wherein said at least one base further comprises a first and a second base, said first base being secured to said frame using at least one of said attachment holes, said second base being secured to said frame using at least one other of said attachment holes, said second base being disposed in spaced relationship to said first base.

3. The roller conveyor of claim 1 wherein said plurality of interchangeable modular components further comprises:
   an L-shaped skid plate fixedly secured to said C-shaped supporting frame; and
   an L-shaped support arm fixedly secured to said L-shaped skid plate.

4. The roller conveyor of claim 1 wherein said plurality of interchangeable modular components further comprises:
   an L-shaped skid plate fixedly secured to said L-shaped mounting plate; and
   a second C-shaped supporting frame secured to said L-shaped skid plate.

5. The roller conveyor of claim 1 wherein said lifting means comprises an elongated flexible conduit inflatable with a pressurized fluid and disposed between said at least one base and its respective roller assembly whereby inflation of said conduit causes said roller assembly to be moved to its upper position while at least partial deflation of said conduit causes said roller assembly to be moved to its lower position.

6. The roller conveyor of claim 1 wherein at least one of said plurality of rollers has a crowned exterior surface.

7. An interchangeable modular fail-safe gravity type roller conveyor for permitting intermittent movement of articles therealong, said conveyor comprising:
a fixed frame having a plurality of attachment holes;
a first base adapted to be fixedly secured to said frame using at least one of said attachment holes, said first base being assembled from at least two of a first plurality of interchangeable modular components;
a second base adapted to be fixedly secured to said frame using at least one of said attachment holes, said second base being spaced from said first base and being assembled from at least two of a second plurality of interchangeable modular components;
a first elongated roller assembly mounted on said first base for vertical movement relative thereto, said first roller assembly including a first elongated support extending longitudinally of said conveyor and a first plurality of nonpowered roller rotatably mounted on said first support, said first plurality of rollers being spaced apart in the longitudinal direction of said first support;
a second elongated roller assembly mounted on said second base for vertical movement relative thereto, said first roller assembly including a second elongated support extending longitudinally of said conveyor and a second plurality of nonpowered rollers rotatably mounted on said second support, said second plurality of rollers being spaced apart in the longitudinal direction of said second support, said first and second plurality of rollers defining a declining plane which extends at an acute angle in order to allow said articles to move by gravity along said first and second roller assemblies when said articles are supported by said first and second roller assemblies;
first lifting means coacting between said first base and said first roller assembly for causing cycling vertical reciprocating movement of said first roller assembly between an upper position and a lower position;
second lifting means coacting between said second base and said second roller assembly for causing cycling vertical reciprocating movement of said second roller assembly between an upper position and a lower position; said articles exhibiting gravity urged movement along said first and second roller assemblies when said first and second roller assemblies are in an upper position, said articles being stopped by contact with said first and second base when said first and second roller assemblies respectively are in said lower position, said first and second roller assemblies being urged into said lower position upon failure of said first and second lifting means respectively;
control means operatively interconnecting said first and second lifting means for causing cyclic actuation thereof in order to cause said first and second roller assemblies to vertically reciprocate between said upper and lower positions in a repetitive manner: and wherein said first plurality of interchangeable modular components being assembled to create said first base comprises:
a first L-shaped mounting plate: and
a first C-shaped supporting frame secured to said L-shaped mounting plate to form a generally rectangular longitudinally running channel, said elongated roller assembly being disposed within said longitudinally running channel.

8. The roller conveyor of claim 7 wherein said first plurality of interchangeable modular components being assembled to create said first base further comprises:
a first L-shaped skid plate fixedly secured to said first C-shaped supporting frame; and
a first L-shaped support arm fixedly secured to said first L-shaped skid plate.

9. The roller conveyor of claim 7 wherein said first plurality of interchangeable modular components being assembled to create said first base further comprises:
a first L-shaped skid plate fixedly secured to said first L-shaped mounting plate; and
a second C-shaped supporting frame secured to said first L-shaped skid plate.

10. The roller conveyor of claim 7 wherein said second plurality of interchangeable modular components being assembled to create said second base comprises:
a second L-shaped mounting plate; and
a second C-shaped supporting frame secured to said second L-shaped mounting plate to form a generally rectangular longitudinally running channel, said elongated roller assembly being disposed within said longitudinally running channel.

11. The roller conveyor of claim 10 wherein said second plurality of interchangeable modular components being assembled to create said second base further comprises:
a second L-shaped skid plate fixedly secured to said second C-shaped supporting frame; and
a second L-shaped support arm fixedly secured to said second L-shaped skid plate.

12. The roller conveyor of claim 10 wherein said second plurality of interchangeable modular components being assembled to create said second base further comprises:
a second L-shaped skid plate fixedly secured to said second L-shaped mounting plate; and
a third C-shaped supporting frame secured to said second L-shaped skid plate.

13. The roller conveyor of claim 7 wherein said first lifting means comprises an elongated flexible conduit inflatable with a pressurized fluid and disposed between said at least one base and its respective roller assembly whereby inflation of said conduit causes said roller assembly to be moved to its upper position while at least partial deflation of said conduit causes said roller assembly to be moved to its lower position.

14. The roller conveyor of claim 7 wherein said second lifting means comprises an elongated flexible conduit inflatable with a pressurized fluid and disposed between said at least one base and its respective roller assembly whereby inflation of said conduit causes said roller assembly to be moved to its upper position while at least partial deflation of said conduit causes said roller assembly to be moved to its lower position.

15. The roller conveyor of claim 7 wherein at least one of said first plurality of rollers has a crowned exterior surface.

16. The roller conveyor of claim 7 wherein at least one of said second plurality of rollers has a crowned exterior surface.

* * * * *